Dec. 17, 1963 T. KIRALY 3,114,621
APPARATUS FOR CUTTING OFF LENGTHS OF GLASS TUBING
Original Filed April 9, 1957 3 Sheets-Sheet 3

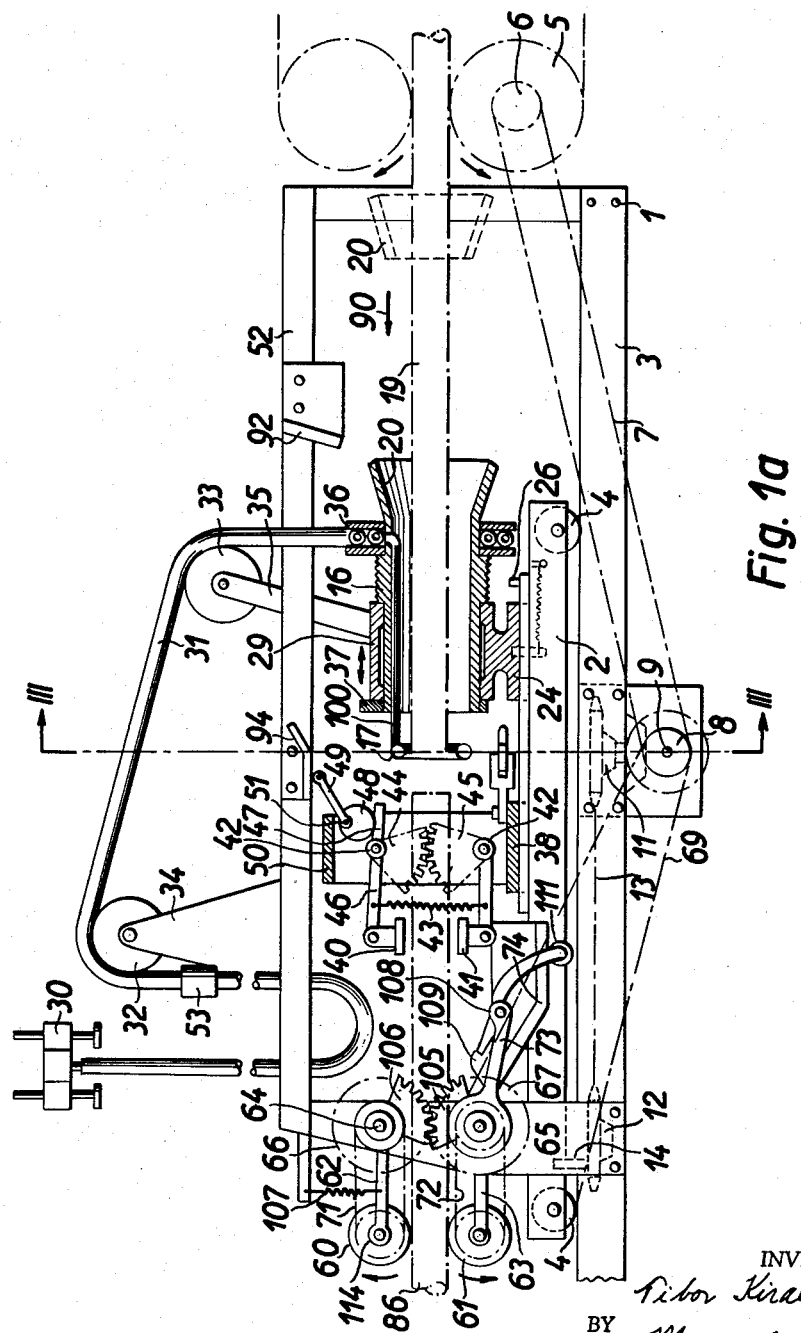

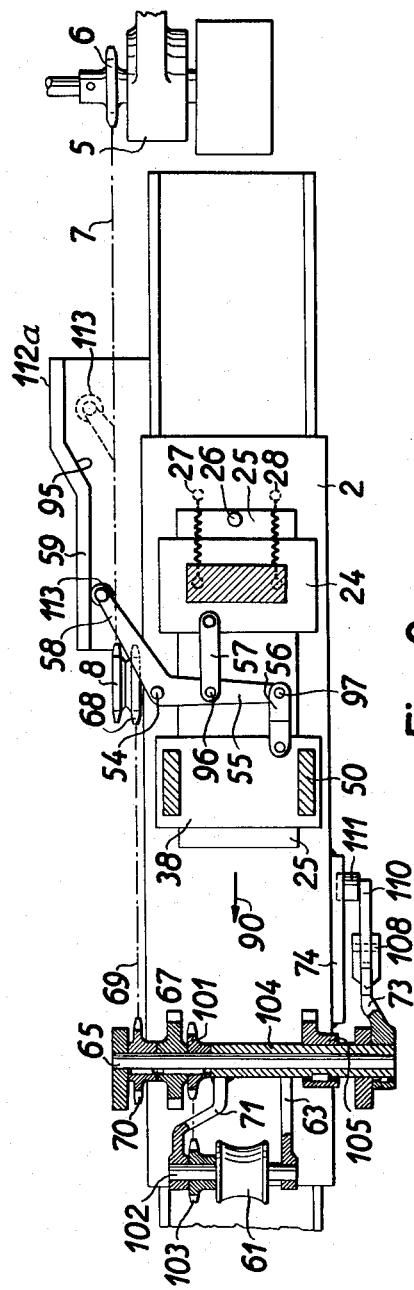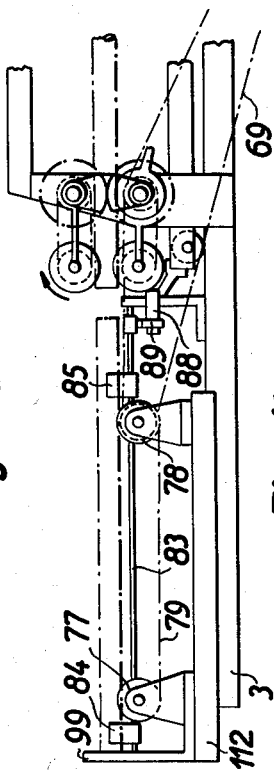

INVENTOR.
Tibor Kiraly
BY
ATTORNEYS

United States Patent Office 3,114,621
Patented Dec. 17, 1963

3,114,621
APPARATUS FOR CUTTING OFF LENGTHS OF GLASS TUBING
Tibor Kiraly, 8 Ham Kalman-Utca, Budapest, Hungary
Original application Apr. 9, 1957, Ser. No. 651,754, now Patent No. 2,993,304, dated July 25, 1961. Divided and this application June 29, 1959, Ser. No. 823,455
Claims priority, application Hungary Apr. 13, 1956
3 Claims. (Cl. 65—272)

This invention relates to apparatus for cutting off predetermined lengths of glass tubing.

For this purpose there has been proposed an apparatus provided with clamping jaws pulling the tubing continuously fed from a glass furnace, with a burner to heat the tubing at a certain point thereon to a temperature high enough so that a fast temperature change occurs when said point is engaged by a cold cracking tool and severance occurs.

The main disadvantage of this apparatus consists in false breaks and great amount of chipping. The ends of the severed tubings show uneven edges which have to undergo a treatment in separate machines in order to reduce the length of the severed tubing to a predetermined value and to round off the edges. Thereby the prime costs are increased and productiveness lowered.

The principal object of my invention, generally considered, is to provide apparatus to cut off lengths of vitreous tubing, especially for making envelopes for fluorescent lamps, accurately and without cracking so that they can be used without further trimming and cutting.

Another object of my invention is to provide a carriage supporting jaws, means for causing the carriage to travel along with tubing, lengths of which are to be cut off, a burner for softening the glass at the point where severage is desired and means adapted to stretch the softened section of the heated tubing until severance occurs.

It is another object of this invention to provide means adapted to move the burner during stretching of the tubing with a velocity equal to the velocity of the point of the tubing where severance of the tubing is desired.

Still another object of the invention is to provide a glass cutter easy to use and which eliminates false breaks and chipping.

A further object of the invention is to provide glass cutting apparatus incorporating means for accurately measuring and positioning the glass tubing to be cut and also having adjustable means for engaging the tubing and positioning the same so that any number of pieces of the same size may be cut successively after a single adjustment of the apparatus.

Still another object of the invention is the provision in glass cutting apparatus of means adapted to cut glass tubing having very small wall-thickness such as tubings for the manufacture of ampoules for therapeutic solutions.

Further objects of the invention and advantages thereof will best be understood by reference to the following description taken in connection with the accompanying drawings and its scope will be pointed out in the appended claims.

In the drawing in which like parts are indicated by like reference numerals:

FIG. 1a is a side elevational view of the right part of an apparatus for practicing my invention.

FIG. 1b is a side elevational view of the left part of the apparatus shown in FIG. 1a, the two parts forming an entirety and incorporating one embodiment of this invention.

FIG. 2a is a horizontal view of the right part of the apparatus as shown in FIG. 1a. The mechanisms arranged on the bases 24 and 38 have been omitted in FIG. 2a.

Figure 2B:
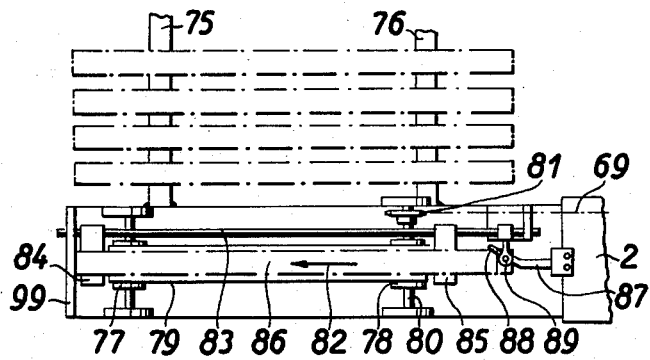
FIG. 2b is a horizontal view of the left part of the apparatus shown in FIG. 1b.
Figure 3:
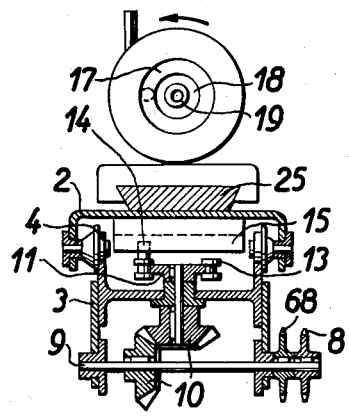
FIG. 3 is a partial, cross sectional view taken along the line III—III of FIG. 1a, on a greater scale.

Referring to the drawing in detail there is provided a table or support 1 the upper edge of which forms a track 3 on which rests a carriage 2 supported on preferably four wheels 4. The carriage 2 is moved to and fro along said track 3 by means of the tube pulling machine 5, chain wheel 6, chain 7, chain wheel 8 secured on a shaft 9, bevel gearing 10 and chain wheels 11 and 12 (FIG. 3) provided on the tracks 3 and driving an endless chain 13. Fixed on the endless chain 13 there is a catch 14 engaging with a transverse slot 15 (FIG. 3) provided in the frame of the carriage 2. This transverse slot 15 in the frame of the carriage 2 allows the catch 14 to shift from one side of the driving chain 13 to the other while it is running around the outer parts of the wheels 10 and 11. The transmission ratio of the drive described above should be chosen so that the velocity of the catch 14 and thereby that of the carriage 2 be equal to the velocity of the oncoming tubing during the movement of the carriage 2 to the left, i.e. when both the carriage 2 and the tubing 19 are moving in the same direction. Fixed on a base 24 there is a hollow bearing member 29 and rotatably mounted in it a hollow drum 16. The base 24 is slidably arranged upon a dovetail guide 25 provided on the carriage 2 and is constantly drawn towards an abutment 26 on said base 24 by means of springs 27, 28 (FIG. 2a). On the frontside of said drum 16 there is mounted a ring burner 17 which directs gas-flames 18 radially inward (FIG. 3). The tubing 19 coming from the tube pulling machine 5 passes through a funnel 20 provided at the rear part of the drum 16, through the drum 16 and the ring burner 17 all these parts being arranged coaxially and connected rigidly to one another.

Figure 4:
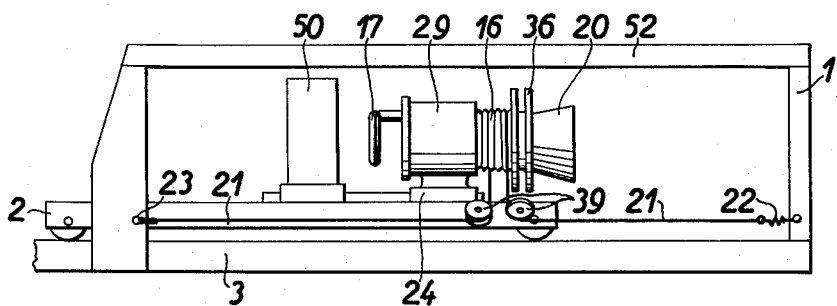
FIG. 4 is a partial, side elevational view of the mechanism mounted on base 24.

Base 24, which supports burner 17, is designated as the first support on carriage 2. During reciprocation of the carriage 2, drum 16 is rotated by means of a metal rope 21 (FIG. 4) one end of which is resiliently attached to the support 1 by means of a spring 22, the other end to the frame 1 by means of a hook 23. The middle part of the metal rope 21 is wound around the drum 16 and guided by means of rollers 39 rotatably mounted on the carriage. Gas is supplied to the ring-burner from a supply valve 30 by means of a flexible hose 31 guided along guide rollers 32 and 33 rotatably arranged in brackets 34 and 35 respectively. From the roller 33 the hose 31 passes to a hose-drum 36 fixed on or made integral with the drum 16 where it is alternately wound up and off according to the sense of rotation of the drum 16. The gas passes from the hose 31 through a tube 100 arranged in the drum 16 to a ring-burner 17. The ring burner 17 is fixed on a flange 37 of the drum 16. The hose 31 is counterbalanced by a balance weight 53.

The carriage also supports a second base 38 slidably guided on the dovetail 25 provided upon the carriage 2. This base 38 supports a pair of clamping jaws 40 and 41 pivotally mounted as indicated at 42. Jaws 40 and 41 are interconnected by means of a tension spring 43 and are caused to move together by intermeshing segmental gears 44 and 45, whereby spring 43 and gears 44, 45 are arranged outside the path of the tubing 19. Gears 44 and 45 are mounted on frame 50, which is part of base 38. The lever 46 carrying the upper jaw 40 extends rearwardly and the extending end 47 of said lever 46 cooperates with a cam 48 fixedly connected to a bent lever 49 pivotally mounted on frame 50 as indicated at 51. Cam 48 is self-locking and releases only at the end of the backward travel of the carriage 2. Then jaws 40, 41 are urged one against the other by means of the spring 43 in order to grip the tubing. At the end of the running ahead of the carriage 2 lever 49 cooperates with an inclined guide 94 provided on a longitudinal girder 52 of the frame 1. Base 38, which carries jaws 40 and 41, is designated as the second support on carriage 2.

A second bent lever is pivotally mounted on the carriage 2 as indicated at 54 (FIG. 2a). The end of the lower arm 55 of this lever is by means of a tie 56 connected to the second support or base 38 and the middle part of the lever by means of a tie 57 to the first support or base 24. The upper arm 58 of said bent lever 55, 58 cooperates with a guide 59 fixed on the side of the track 3 (FIG. 1a).

In order to remove the cut tubing from the apparatus described above there are provided two rollers 60 and 61, each one at the outer end of brackets 62 and 63, respectively, the brackets being pivotally mounted as indicated at 64 and 65 respectively. The rollers 60 and 61 are caused to rotate in opposite directions by intermeshing gears 66 and 67, said gears 66 and 67 being driven by means of a chain wheel 68 fixed on the shaft 9, chain 69, chain wheel 70 and chains 71 and 72 respectively (FIG. 2a). The peripheral speed of the rollers 60 and 61 must be greater than the velocity of the tubing 19.

Gear 67, driven by means of the wheel 70 and chain 69, is rigidly connected to or integral with a chain wheel 101, rotates a chain wheel 103 secured on a shaft 102 (FIG. 2a). Roller 61 rotates together with the chain wheel 103. Bracket 63 holding the roller 61 is integral with a sleeve 104 rotatably arranged on the shaft 65. Roller 60 is likewise arranged on the shaft 114. Sleeve 104 is provided with a segmental gear 105 intermeshing a second segmental gear 106 controlling the bracket 62. In the position shown in FIG. 1a, the gears 105 and 106 hold the rollers 60 and 61 in the open position, against spring 107. On the carriage 2 there is arranged a guide rail 74 and on the sleeve 104 a lever 73 with a stop 110 pivotally mounted on the lever 73 as indicated at 108 and held in the shown position by means of a spring 109. Roller 111, provided at the free end of the stop 110, engages at the end of the running ahead of the carriage 2 the lower edge of the guide rail 74. By these means the cut-off tubing 19 is resiliently clamped and removed by the rollers 60 and 61 after releasing of the jaws 40 and 41.

The cut-off tubings must be transported from the carriage 2 (as shown on FIG. 1b and FIG. 2b) to horizontally arranged supporting arms 75 and 76 fixed on the frame 112 of the apparatus said frame being fixed on the tracks 3. For this purpose there are provided two rotatable rollers 77 and 78 supporting an endless belt 79. Shaft 80 of the roller 78 is driven by means of the chain 69 and a chain wheel 81 fixed on the shaft 80. In order to transport the tubing conveyed by the belt 79 in the direction of the arrow 82 onto the supporting arms 75 and 76 there is provided a swingable shaft 83 having at each end a peg 84 and 85, respectively, so arranged that the pegs underlie the cut-off tubing 86 oncoming upon the belt 79. The shaft 83 with the pegs 84 and 85 is operated by means of a setting arm 87 fastened on the carriage 2. The free end 88 of the arm 87 is downwardly sloping and cooperates with a cam 89 provided at the end of the shaft 83. As carriage 2 moves to the left, cam 89 rides upwardly upon arm end 88, thereby tilting pegs 84 and 85 so that the tubing rolls to the broken line position of FIG. 2b.

The apparatus for cutting off lengths of tubings described above operates as follows:

The tubing 19 is fed continuously from the tube pulling machine 5 in the direction of the arrow 90 to the cut off apparatus. The carriage 2 is in its right hand end position partly shown with dotted lines 20 in FIG. 1a. In this position lever 49 engages an inclined guide 92 provided on the longitudinal girder 52 and the clamping jaws 40 and 41 are thereby forced towards each other and grip the tubing 19 which still has passed through the funnel 20, drum 16 and ring-burner 17. The apparatus is so adjusted that the ring-burner 17 is spaced from the free end of the tubing the distance corresponding with the length of tubing to be cut. Catch 14 is moving towards the other end of the slot 15 and pulls the carriage in the direction of the arrow 90. The part of tubing 19 lying in the burner is heated and begins to soften. During the moving of the carriage 2 ahead funnel 20, drum 16 and ring-burner 17 are by means of the metal rope 21 rotated in a clockwise direction viewed from the side of funnel 20. Thus a ring-shaped section of the tubing 19 lying inside the ring-burner is homogeneously heated and softened. At a predetermined time which depends upon the velocity of the movement of the carriage 2 roller 113 leaves section 112a of guide 59 and engages section 95 of the guide 59. While running along said section 95 of the guide 59 the lower arm 56 of the bent lever 55, 58 pushes the base 38 along its guide 25 in the direction of the arrow 90 and pulls the base 24 in the same direction but somewhat slower. I prefer to choose the distances between the linking points 54 and 96 and 54 and 97 respectively, so that during stretching of the softened part of the tubing lying in the flames of the ring-burner 17 the speed of base 24 carrying said burner to about the half of the speed of base 38 carrying the clamping jaws 40, 41. Thus the ring-burner will always be positioned at the middle of the softened section of the tubing. As in this phase of the process the speed of the tubing 86 to be cut off is greater than the speed of the remaining part of the tubing 19 the softened section of the tubing will be stretched, the wall-thickness of this section of the tubing diminishes and melting thoroughly tubing 86 and tubing 19 part from each other. Simultaneously the edges of the two parts separated from each other will be shaped by the flames of the burner 17. During the return stroke of carriage 2, when roller 113 engages section 95 and then sections 112 of guide 59, springs 27 and 28 pull base 24 back until it engages stop 26 provided upon carriage 2, the links 57 and 56 and lever 55 simultaneously restoring base 38 to its initial position.

Lever 49 engages guide 94 whereupon the clamping jaws 40, 41 release the cut off tubing 86 which is transported by means of the rollers 60, 61 pressed to the tubing by the guide 74, stop 110 and roller 111 and rotated at a greater peripheral speed than the speed of the tubing 19. The cut-off tubing 86 is transporated by means of the endless belt 79 until it engages stop 99, whereupon tubing 86 is removed upon the arms 75 and 76 by the pegs 84 and 85 operated by the free end 88 of the setting arm 87.

While a particular embodiment of the invention has been shown, it will be understood that the invention is not limited thereto since many modifications may be made and it is, therefore, contemplated to cover by the appended claims any such modifications as fall within the spirit and scope of the invention.

Reference is made to my co-pending application Serial No. 651,754, filed April 9, 1957, now Patent No. 2,993,-304, patented July 25, 1961, of which this is a division.

What is claimed is:

1. Apparatus for cutting off lengths of vitreous tubing comprising means for conveying said tubing longitudinally forwardly, a carriage mounted for longitudinal reciprocal movement in the path of the tubing, means for reciprocating the carriage, a first support on said carriage, a burner on said first support, a second support on said carriage in front of said first support, clamping jaws on said second support and movable between opening and closing positions, said tubing being adapted to extend through said burner and said jaws, said supports being longitudinally reciprocally slidable relative to said carriage, means for respectively reciprocating said supports, and actuating means for first closing said jaws clampingly on said tubing while said carriage is moving forwardly and for then moving said supports forwardly relative to said carriage with said second support moving faster than said first support.

2. Apparatus for cutting off lengths of vitreous tubing comprising means for conveying said tubing longitudinally forwardly, a carriage mounted for longitudinal reciprocal movement in the path of the tubing, means for reciprocating the carriage with the forward movement of the carriage being at the same speed as the speed of movement of the tubing, a first support on said carriage, a ring-shaped burner on said first support, means for rotating said burner about its axis, a second support on said carriage in front of said first support, clamping jaws on said second support and movable between opening and closing positions, said tubing being adapted to be extended through said burner and said jaws, said supports being longitudinally reciprocally slidable relative to said carriage, means for respectively reciprocating said supports in the same sense with the forward speed of said second support being approximately twice the forward speed of said first support, and actuating means coupled to the means for reciprocating the carriage for first closing said jaws clampingly on said tubing while said carriage is moving forwardly and after a time interval permitting softening of said tubing by said burner, for then moving said supports forwardly relative to said carriage.

3. Apparatus for cutting off lengths of vitreous tubing comprising means for conveying said tubing longitudinally forwardly, a carriage mounted for longitudinal reciprocal movement in the path of the tubing, means for reciprocating said carriage, a first support on said carriage, a ring-shaped burner rotatably mounted on said first support, a second support on said carriage in front of said first support, clamping jaws on said second support and movable between opening and closing positions, said tubing being adapted to be extended through said burner and said jaws, said suports being longitudinally reciprocally slidable in the same sense of movement relative to said carriage, the speed of the rearward stroke of movement of said carriage and the position of said clamping jaws being such that the leading end of the tubing is received between said clamping jaws at approximately the end of the rearward stroke of movement of said carriage, means including first cam means on said frame positioned and adapted to close said jaws clampingly on the front end of said tubing at the end of the rearward stroke of said carriage and to hold said jaws clamped during forward movement of said carriage, the forward movement of said carriage being at the speed of tubing movement, said burner being adapted to soften the ring-shaped section of the tubing lying inside the ring burner during the initial time of forward movement of the carriage, means including second cam means drivingly coupled to said first support and said second support for then moving said second support and said first support forwardly relatively to said carriage with said second support moving at twice the velocity of said first support to keep said burner centered on the softened portion of said tubing while moving the tubing segment located forwardly of the softened section more rapidly than the tubing rearwardly of the softened section, whereby to stretch the softened portion of the tubing until the tubing separates, means including third cam means on said frame positioned and adapted for then moving said jaws to unclamping position, and means including said second cam means for then returning said first and second supports to their initial position.

References Cited in the file of this patent
UNITED STATES PATENTS

| | | |
|---|---|---|
| 2,215,980 | Schreiber | Sept. 24, 1940 |
| 2,221,788 | Doyle | Nov. 19, 1940 |
| 2,393,979 | Everett | Feb. 5, 1946 |
| 2,521,352 | Dockerty et al. | Sept. 5, 1950 |
| 2,603,038 | McGowan | July 15, 1952 |
| 2,728,447 | Ware | Dec. 27, 1955 |
| 2,776,048 | Friedman | Jan. 1, 1957 |

FOREIGN PATENTS

| | | |
|---|---|---|
| 685,758 | France | July 17, 1930 |